United States Patent
Naito et al.

(10) Patent No.: US 11,504,891 B2
(45) Date of Patent: Nov. 22, 2022

(54) SCREW OF INJECTION MOLDING MACHINE FOR FOAM MOLDING AND INJECTION MOLDING MACHINE

(71) Applicant: THE JAPAN STEEL WORKS, LTD., Tokyo (JP)

(72) Inventors: Akihiro Naito, Hiroshima (JP);
Katsuyuki Araki, Hiroshima (JP);
Koichi Tamada, Hiroshima (JP);
Hiromasa Uezono, Hiroshima (JP);
Hideaki Nakashima, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 17/270,135

(22) PCT Filed: Aug. 23, 2019

(86) PCT No.: PCT/JP2019/032977
§ 371 (c)(1),
(2) Date: Feb. 22, 2021

(87) PCT Pub. No.: WO2020/045265
PCT Pub. Date: Mar. 5, 2020

(65) Prior Publication Data
US 2021/0178648 A1 Jun. 17, 2021

(30) Foreign Application Priority Data
Aug. 27, 2018 (JP) .............................. JP2018-158759

(51) Int. Cl.
*B29C 45/52* (2006.01)
*B29C 44/34* (2006.01)

(52) U.S. Cl.
CPC .......... *B29C 45/52* (2013.01); *B29C 44/3403* (2013.01); *B29C 44/35* (2013.01)

(58) Field of Classification Search
CPC ......... B29C 45/52; B29C 45/50; B29C 44/35; B29C 44/424
See application file for complete search history.

(56) References Cited

U.S. PATENT DOCUMENTS

2002/0017734 A1 2/2002 Sugihara et al.
2005/0003032 A1 1/2005 Sugihara et al.
(Continued)

FOREIGN PATENT DOCUMENTS

CN 107206651 A 9/2017
CN 107848183 A 3/2018
(Continued)

OTHER PUBLICATIONS

Communication dated May 15, 2020 issued by the Taiwanese Patent Office in application No. 108130663.
(Continued)

*Primary Examiner* — Kelly M Gambetta
*Assistant Examiner* — Virak Nguon
(74) *Attorney, Agent, or Firm* — Sughrue Mion, PLLC

(57) ABSTRACT

The present disclosure relates to a screw of an injection molding machine in which a heating cylinder is formed with a first compression section, a starvation section, and a second compression section, and in which an inert gas is to be introduced into the starvation section. At a portion of the screw corresponding to the first compression section, a barrier flight as a double flight including a combination of a main flight and a sub-flight having a lead angle larger than that of the main flight is formed, and a dam flight having a predetermined-width ring shape is formed, downstream of, i.e., in front of the barrier flight. A seal structure to prevent backflow of the resin may be provided between the dam flight and the starvation section.

6 Claims, 3 Drawing Sheets

(56) References Cited

U.S. PATENT DOCUMENTS

| | | | |
|---|---|---|---|
| 2005/0006805 A1 | 1/2005 | Sugihara et al. | |
| 2009/0315219 A1* | 12/2009 | Shelby | B29C 48/635 |
| | | | 264/328.17 |
| 2017/0355119 A1 | 12/2017 | Nobuta et al. | |
| 2018/0022003 A1* | 1/2018 | Nobuta | B29C 45/0005 |
| | | | 264/328.18 |
| 2018/0117823 A1* | 5/2018 | Yusa | B29C 45/18 |
| 2020/0223122 A1 | 7/2020 | Yusa et al. | |

FOREIGN PATENT DOCUMENTS

| | | | |
|---|---|---|---|
| EP | 3 431 246 A1 | | 1/2019 |
| JP | 200279545 A | | 3/2002 |
| JP | 2003103587 A | | 4/2003 |
| JP | 2003117973 A | | 4/2003 |
| JP | 2004-98335 A | | 4/2004 |
| JP | 2007054995 A | | 3/2007 |
| JP | 2008272999 A | | 11/2008 |
| JP | 2015168079 A | * 9/2015 | B29C 45/17 |
| JP | 2017100459 A | | 6/2017 |
| JP | WO2017/159166 A1 | | 9/2017 |
| JP | 6211664 A | | 10/2017 |

OTHER PUBLICATIONS

Communication dated Oct. 16, 2020 issued by the Taiwanese Patent Office in application No. 108130663.
International Search Report (PCT/ISA/210) dated Oct. 21, 2019 issued by the International Searching Authority in International Application No. PCT/JP2019/032977.
Written Opinion (PCT/ISA/237) dated Oct. 21, 2019 issued by the International Searching Authority in International Application No. PCT/JP2019/032977.
Communication dated Dec. 2, 2021 by the Japanese Patent Office in Japanese Patent Application No. 2018-158759.
Notice of Opposition dated Mar. 12, 2021 by the Japanese Patent Office in counterpart Japanese Patent Application No. 2013-158759.
Notice of Reasons to Revocation dated Jul. 13, 2021 by the Japanese Patent Office in counterpart Japanese Patent Application No. 2018-158759.

* cited by examiner

SCREW OF INJECTION MOLDING MACHINE FOR FOAM MOLDING AND INJECTION MOLDING MACHINE

CROSS-REFERENCE TO RELATED APPLICATIONS

This application is a National Stage of International Application No. PCT/JP2019/032977 filed on Aug. 23, 2019, claiming priority based on Japanese Patent Application No. 2018-158759 Aug. 27, 2018.

TECHNICAL FIELD

The present invention relates to a screw of an injection molding machine for use in foam molding in which an inert gas is introduced into a molten resin and injected into a mold to obtain a foam molded product, and an injection molding machine.

BACKGROUND ART

Molded products containing a large number of fine bubbles inside, that is, foam molded products, are not only lightweight but also excellent in strength, and have a wide range of applications. In order to obtain a foam molded product by injection molding, it is necessary to mix a foaming agent with a resin. As the foaming agent, chemical foaming agents such as azodicarbonamide, which is decomposed by heat to generate a gas, are used, and physical foaming agents, that is, inert gases such as nitrogen and carbon dioxide, are also commonly used. When the inert gas is used as a foaming agent, the inert gas is introduced at a predetermined pressure into the resin melted in a heating cylinder so that the inert gas is saturated in the resin. When this is injected into a mold, the pressure is released in the resin and the inert gas becomes bubbles. When the resin is cooled and solidified, a foam molded product is obtained. Since the physical foaming agent containing an inert gas is introduced into the resin at high pressure and high temperature, a strong penetrating power is exerted and the physical foaming agent is easily dispersed uniformly in the resin as compared with the chemical foaming agent. Therefore, the obtained foam molded product has an excellent feature that foaming unevenness is unlikely to occur.

CITATION LIST

Patent Literature

Patent Literature 1: Japanese Patent No. 6211664
Patent Literature 2: JP-A-2002-79545

SUMMARY OF INVENTION

Technical Problem

Patent Literature 1 describes an injection molding machine that can stably and appropriately introduce an inert gas into a molten resin and can appropriately carry out foam molding. Further, Patent Literature 2 also describes an injection molding machine for carrying out foam molding.

Each of the injection molding machines described in Patent Literatures 1 and 2 also has excellent points. However, there is room for improvement in these injection molding machines. Regarding the injection molding machine described in Patent Literature 1, since it is necessary to provide a seal structure and a step-down relaxation section on a screw, a length of the screw is longer accordingly. That is, there is a problem that the machine length is longer. The injection molding machine described in Patent Literature 2 has a short machine length, but since the screw is not provided with a seal structure or the like, there is a possibility of backflow of the inert gas.

An object of the present invention is to provide a screw of an injection molding machine with a sufficiently short machine length which has no concern about a phenomenon that gas flows or leaks toward an upstream side of the screw in a heating cylinder during a molding cycle or when rotation of the screw is stopped due to maintenance or the like, that is, backflow in an injection molding machine for introducing a physical foaming agent containing gas into a molten resin to mold a foam molded product, and which therefore can carry out molding stably and can be installed even in a limited installation area, and to provide an injection molding machine.

Solution to Problem

In order to achieve the above object, a subject of the present invention is a screw of an injection molding machine in which a first compression section in which a resin is to be compressed, a starvation section in which a pressure of the resin is to be lowered, and a second compression section in which the resin is to be compressed from a rear side to a front side thereof, and in which gas is to be introduced into the starvation section, or an injection molding machine. In the present invention, at a portion of the screw corresponding to the first compression section, a barrier flight as a double flight including a combination of a main flight and a sub-flight having a lead angle larger than that of the main flight is provided, and a dam flight having a predetermined-width ring shape is provided downstream of, i.e., in front of the barrier flight. A seal structure to prevent backflow of the resin may be provided between the dam flight and the starvation section.

Thus, in order to achieve the above object, the screw of an injection molding machine for foam molding and the injection molding machine according to the present invention have features of the following [1] to [5].

[1]
A screw of an injection molding machine for foam molding in which a first compression section in which a resin is to be compressed, a starvation section in which a pressure of the resin is to be lowered, and a second compression section in which the resin is to be compressed are provided in a heating cylinder from a rear side to a front side thereof due to a shape of the screw, and in which a gas is to be introduced into the starvation section, the screw including at a portion corresponding to the first compression section of the screw: a barrier flight including a combination of a main flight and a sub-flight having a lead angle larger than that of the main flight; and a dam flight having a predetermined-width ring shape formed in front of the barrier flight.

[2]
In the screw according to [1], the screw is provided with a predetermined seal structure to prevent backflow of the resin between the dam flight and the starvation section.

[3]
In the screw according to [2], the seal structure includes: a seal configured to liquid-tightly separate the first compression section from the starvation section; a communication passage configured to communicate the first compression section and the starvation section; and a valve mechanism configured to close the communication passage and cause a molten resin to flow into the starvation section when the molten resin in the first compression section exceeds a predetermined pressure.

[4]

In the screw according to [2], the seal structure includes: a diameter-reduced portion in which a diameter of the screw is reduced; and a seal ring which is fitted to the diameter-reduced portion with a predetermined gap therebetween and which is liquid-tightly slid with respect to a bore of the heating cylinder, in which a tapered surface is formed on the diameter-reduced portion to block communication between the first compression section and the starvation section when the seal ring is seated.

[5]

An injection molding machine including the screw according to any one of [1] to [4], in which the heating cylinder is provided with an introduction port which introduces gas at a predetermined position corresponding to the starvation section.

Advantageous Effects of Invention

As described above, the present invention is configured as the screw of an injection molding machine in which the first compression section in which the resin is to be compressed, the starvation section in which the pressure of the resin is to be lowered, and the second compression section in which the resin is to be compressed are provided in the heating cylinder from the rear side to the front side thereof due to the shape of the screw, and the gas is to be introduced into the starvation section, or as the injection molding machine. In such a screw, the backflow of the gas when the rotation of the screw is stopped is generally a problem. In the present invention, at the portion of the screw corresponding to the first compression section, the barrier flight including the combination of the main flight and the sub-flight having a lead angle larger than that of the main flight is formed, and the dam flight having a predetermined-width ring shape is formed in front of the barrier flight. As will be described in detail later, in both the barrier flight and the dam flight, a seal made of a thin molten resin layer is formed inside the heating cylinder. The backflow of the gas is prevented when the seal is formed. In the present invention, since two types of seals are formed at two positions, i.e., the barrier flight and the dam flight, the backflow of the gas is substantially and completely prevented even when the rotation of the screw is stopped for about 10 minutes. Further, the screw can prevent substantially and completely the backflow of the gas in this way, and it is not necessary to provide a special section in the heating cylinder for preventing the backflow. That is, in the heating cylinder, only the first compression section, the starvation section, and the second compression section, which are the minimum configurations for carrying out foam molding, need to be provided. Therefore, the screw length can be shortened, and the machine length of the injection molding machine can be shortened. According to another invention, the screw is provided with a predetermined seal structure to prevent the backflow of the resin between the dam flight and the starvation section. Since the seal structure is provided, the effect that the gas does not easily flow back can be obtained even when the screw is stopped for several tens of minutes.

DESCRIPTION OF EMBODIMENTS

Figure 1:
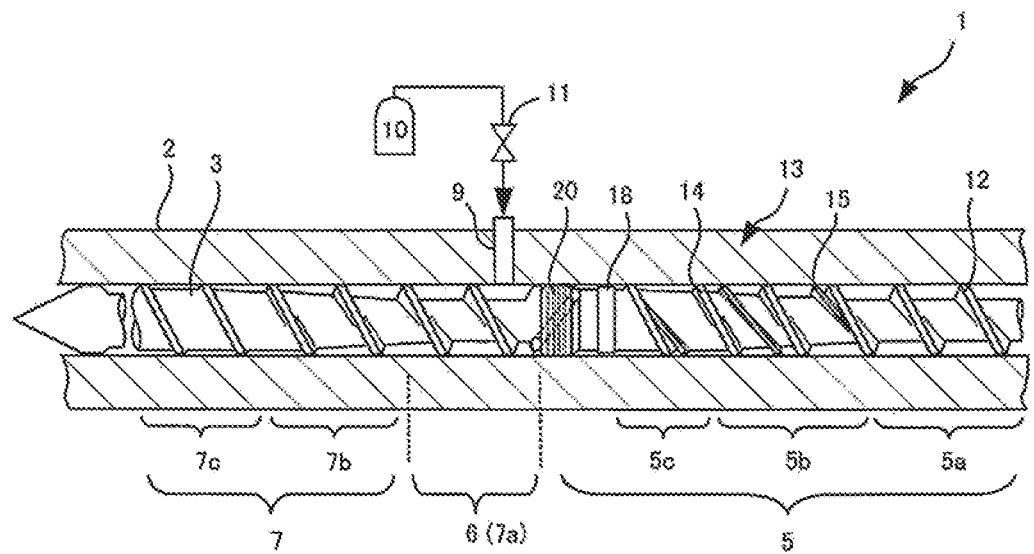
FIG. 1 is a side sectional view of an injection molding machine provided with a screw according to a first embodiment of the present invention.

Hereinafter, embodiments of the present invention will be described. As shown in FIG. 1, an injection molding machine according to a first embodiment of the present invention includes a heating cylinder 2, and a screw 3 that can be driven in a rotational direction and an axial direction in the heating cylinder 2. The heating cylinder 2 is provided with a hopper in the rear, that is, on an upstream side, and an injection nozzle provided in front, that is, on a downstream side. A plurality of band heaters are wound around an outer peripheral surface of the heating cylinder 2. The hopper, injection nozzle and band heaters are not shown in the figure.

Generally, a relatively simple configuration among configurations required for an injection molding machine for foam molding using an inert gas is a configuration that three sections consisting of two compression sections and one starvation section are formed in a heating cylinder, and the inert gas is to be introduced into the starvation section. An injection molding machine 1 according to the first embodiment of the present invention also has such a simple configuration, that is, three sections are formed in the heating cylinder 2. In the heating cylinder 2 of the injection molding machine 1 is formed, due to a predetermined shape of the screw 3, with a first compression section 5, a starvation section 6, and a second compression section 7 from the rear side to the front side, that is, from the upstream side to the downstream side. These sections 5, 6 and 7 will be described in more detail. The first compression section 5 includes a supply portion 5a provided at an upstream portion, a compression portion 5b provided at a middle stream portion, and a measurement portion 5c provided at a downstream portion. A portion of the screw 3 disposed at the supply portion 5a is composed of a screw groove having a constant large groove depth. Accordingly, at the supply portion 5a, a solid resin is heated while being transported. A portion of the screw 3 disposed at the compression portion 5b is composed of a screw groove having a gradually smaller groove depth. Accordingly, at the compression portion 5b, the resin is compressed and pressed against the heating cylinder 2 to be melted. A portion of the screw 3 disposed at the measurement portion 5c is composed of a screw groove having a constant small groove depth. Accordingly, at the measurement portion 5c, the molten resin is compressed to have a constant density. A portion of the screw 3 disposed at the starvation section 6 has a constant groove depth larger than that of the portion of the screw 3 disposed at the measurement portion 5c. The second compression section 7 includes a compression portion 7b and a measurement portion 7c. A portion of the screw 3 disposed at the compression portion 7b has a gradually smaller groove depth. A portion of the screw 3 disposed at the measurement portion 7c has a constant small groove depth. Although, the starvation section 6 and the second compression section 7 are described to be different sections in the present description, the starvation section 6 can also be said to be a supply portion 7a in the second compression section 7. The heating cylinder 2 is provided with an inert gas introduction portion 9 corresponding to such a starvation section 6. When an inert gas is supplied from an inert gas supply portion 10 via an on-off valve 11, the inert gas is introduced into the heating cylinder 2 in the starvation section 6. In the injection molding machine 1, when the screw 3 is rotated to send the resin, the resin is melted and compressed in the first compression section 5, and a pressure of the resin is lowered in the starvation section 6. The inert gas is introduced into the molten resin having a lowered pressure. The molten resin into which the inert gas is introduced is sent to the front side while being kneaded and compressed in the second compression section 7, and an amount of the molten resin permeated with the inert gas is measured at a tip of the screw 3.

The screw 3 of the injection molding machine 1 according to the first embodiment of the present invention has some features at a portion corresponding to the first compression section 5. The first feature is that a barrier flight 13 including a double flight having a predetermined shape is formed in this portion. Specifically, a spiral single flight 12 protruding from an outer surface of a main body of the screw 3 is formed on the portion of the screw 3 disposed at the supply portion 5a of the first compression section 5. The barrier flight 13 is formed on the portion of the screw 3 disposed at the compression portion 5b, the portion of the screw 3 disposed at the measurement portion 5c, or a portion of the screw 3 disposed at the compression portion 5b and the measurement portion 5c, so as to be continuous with the single flight 12. The barrier flight 13 includes a spiral main flight 14 and a sub-flight 15 protruding from the outer surface of the main body of the screw 3. The main flight 14 has the same pitch and lead angle (angle formed by the flight with respect to a radial direction of the screw 3) as those of the single flight 12. The sub-flight 15 has a pitch and lead angle larger than those of the main flight 14. Therefore, in the barrier flight 13, the main flight 14 and the sub-flight 15 are connected to each other at both front and rear end portions thereof. In the present embodiment, a height of the sub-flight 15 is slightly lower than a height of the main flight 14. Therefore, a predetermined gap is formed between a top portion of the sub-flight 15 and a bore of the heating cylinder 2. As will be described later, when the screw 3 is rotated, the unmelted solid resin is deposited on the front side, that is, the downstream side of the sub-flight 15, and the molten resin flows through the predetermined gap and accumulates on the rear side, that is, the downstream side of the sub-flight 15. The presence of the molten resin in the predetermined gap provides a sealing action for preventing backflow of the inert gas.

The second feature of the screw 3 of the injection molding machine 1 according to the first embodiment of the present invention is that a dam flight 18 is formed in front of, that is, on the downstream side of the barrier flight 13, at the portion of the screw 3 disposed in the first compression section 5. The dam flight 18 is composed of a predetermined-width ring-shaped flight protruding outward in the radial direction. Alternatively, it can be said that the flight has a columnar shape whose height is considerably lower than a diameter thereof. Since a gap formed between a top portion of the dam flight 18 and the bore of the heating cylinder 2 is narrow, even if the unmelted solid resin exists, the unmelted solid resin is blocked by the dam flight 18 so as not to be sent forward. The presence of the molten resin in this gap provides a sealing action for preventing the so-called backflow of the inert gas flowing on the upstream side of the screw 3 like the barrier flight 13. The dam flight 18 may be provided to be continuous with the barrier flight 13, or may be provided at a predetermined interval with respect to the barrier flight 13. For example, the predetermined interval is 0.1 D or more, or 0.5 D or more of a diameter D of the heating cylinder 2.

Figure 3:
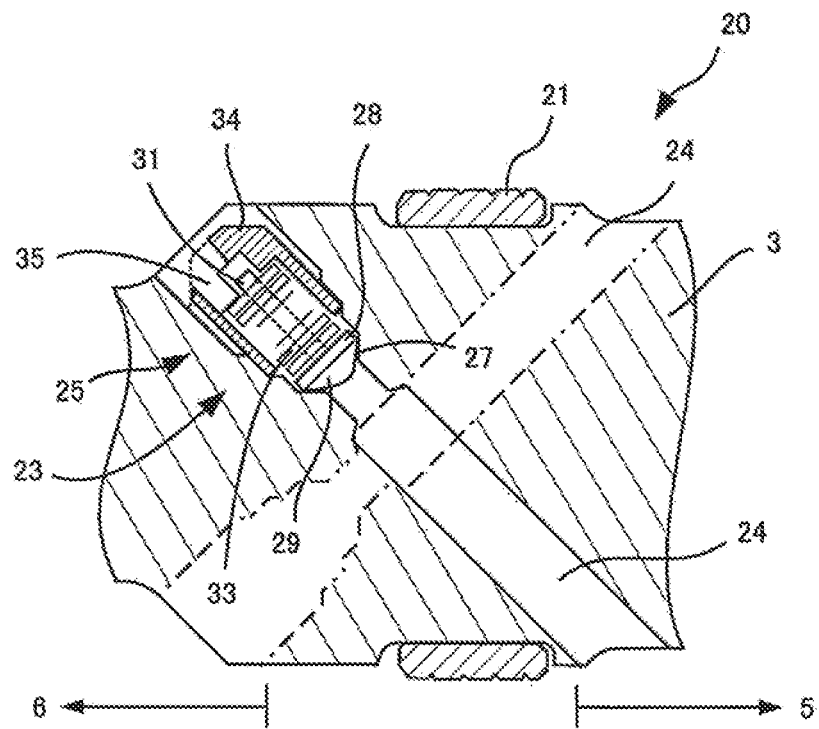
FIG. 3 is a diagram showing a seal structure provided on the screw according to the first embodiment of the present invention, which is a sectional view showing the seal structure cut parallel to an axis of the screw.

The third feature of the screw 3 of the injection molding machine 1 according to the first embodiment of the present invention is that a seal structure 20 is provided at the most downstream portion of the first compression section 5. As shown in detail in FIG. 3, the seal structure 20 includes a seal 21 and a flow control mechanism 23 that exerts a pressure adjusting action. The seal 21 is slidably fitted in a predetermined groove formed in an outer peripheral surface of the screw 3. Although the heating cylinder 2 is not shown in FIG. 3, the seal 21 slides while an outer peripheral surface of the seal is smoothly in contact with the bore of the heating cylinder 2. The seal 21 prevents the molten resin from flowing, and the inside of the heating cylinder 2 is liquid-tightly separated into the first compression section 5 on the upstream side and the starvation section 6 on the downstream side. The seal structure 20 is provided with one or more flow control mechanisms 23. The flow control mechanism 23 includes a communication passage 24 open in the screw 3 so as to communicate the first compression section 5 and the starvation section 6, and a valve mechanism 25 configured to open and close the communication passage 24. A middle portion of the communication passage 24 is reduced in diameter in a tapered shape, whereby a tapered seating surface 27 is formed. When a head portion 29 of a poppet valve 28 constituting the valve mechanism 25 is seated on the seating surface 27, the communication passage 24 is closed. The poppet valve 28 includes the head portion 29 in an umbrella shape and a shaft portion 31, and the shaft portion 31 is provided with a plurality of disc springs 33, 33, . . . . In this way, the poppet valve 28 provided with the disc springs 33, 33, . . . is housed in a retainer 34 with a bottomed hole. The retainer 34 is screwed and fixed to a female screw formed in an inner peripheral surface of the communication passage 24 by a male screw formed on an outer peripheral surface thereof. Therefore, the poppet valve 28 is biased by the disc springs 33, 33, . . . , the head portion 29 is pressed against the seating surface 27, and the communication passage 24 is closed. When the molten resin in the first compression section 5 reaches a predetermined pressure, the poppet valve 28 retreats against the bias of the disc springs 33, 33, . . . . Then, a resin passage 35 open in the retainer 34 communicates the first compression section 5 with the starvation section 6, and the molten resin flows into the starvation section 6. When the pressure in the first compression section 5 is equal to the pressure in the starvation section 6, or when the pressure in the starvation section 6 is higher than the pressure in the first compression section 5, the poppet valve 28 is seated on the seating surface 27 and the communication is cut off, so that the back flow of the molten resin from the starvation section 6 to the first compression section 5 is prevented.

Figure 5:
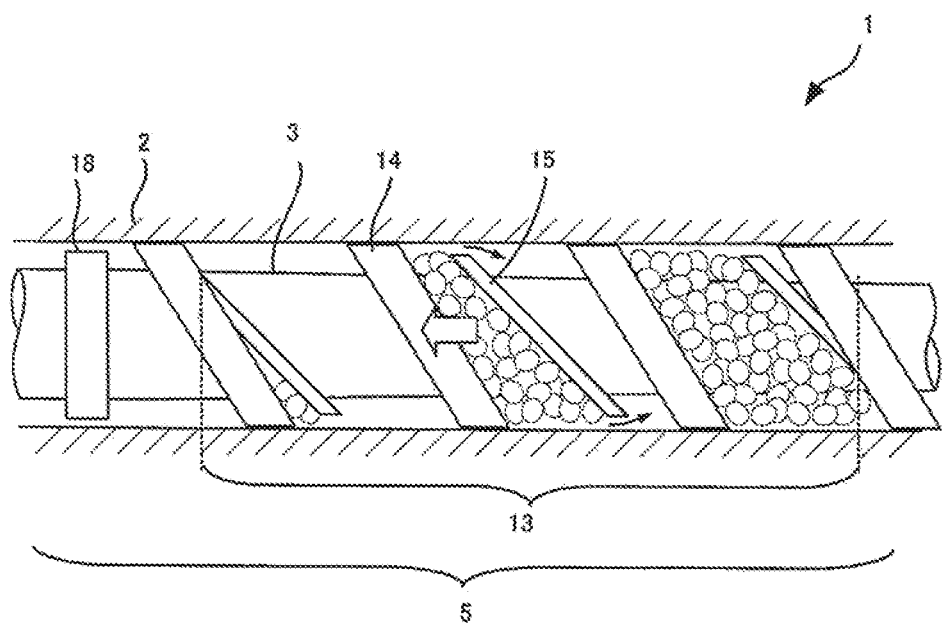
FIG. 5 is a side sectional view showing a part of the injection molding machine provided with a screw according to an embodiment of the present invention.

An operation of the injection molding machine 1 according to the first embodiment of the present invention will be described. The heating cylinder 2 is heated, and the screw 3 is rotated to supply resin pellets into the heating cylinder 2. Then, the resin pellets are sent forward in the heating cylinder 2 while being heated, and are melted in the first compression section 5. As shown in FIG. 5, when the resin is sent forward in the barrier flight 13 of the first compression section 5, the sub-flight 15 having a lead angle larger than that of the main flight 14 has a stronger action of sending the resin forward. Therefore, the unmelted solid resin is forcibly pushed forward by the sub-flight 15. In contrast, the molten resin can flow through the gap between the top portion of the sub-flight 15 and the bore of the heating cylinder 2, so that the molten resin flows to the rear of the sub-flight 15. As a result, the unmelted solid resin is sent downstream while accumulating in the front of the sub-flight 15, and the molten resin is sent downstream while a region in the rear of the sub-flight 15 is filled with the molten resin. The molten resin is kneaded and compressed, and passes through the dam flight 18. Since the gap between the top portion of the dam flight 18 and the bore of the heating cylinder 2 is small, even if the unmelted solid resin exists, the unmelted solid resin is blocked by the dam flight 18. This ensures that only the molten resin is sent forward. The molten resin is sent to the starvation section 6 through the seal structure 20. At the starvation section 6, since the screw groove is deep, the pressure of the resin is lowered. Therefore, a gas phase is formed in the starvation section 6 inside the heating cylinder 2. The inert gas is introduced from the inert gas introduction portion 9. The molten resin into which the inert gas is introduced is compressed and kneaded in the second compression section 7 and sent to the front of the screw 3. That is, measurement is made. When the measurement is completed, the molten resin is injected out. That is, the rotation of the screw 3 is stopped and the screw 3 is driven in the axial direction. Then, a cavity of a mold is filled with the molten resin. The inert gas foams to obtain a foam molded product.

When the screw 3 is rotating, a difference in pressure of the resin is generated in the sections 5, 6 and 7 inside the heating cylinder 2. However, when a molding cycle is interrupted and the screw 3 is stopped for a long time due to maintenance or the like, the difference in pressure of the molten resin in the heating cylinder 2 is lowered. As a result, there is a concern that the inert gas flows back in the heating cylinder 2 or the molten resin is pushed out by the inert gas and flows back. In the injection molding machine 1 according to the first embodiment of the present invention, such backflow is substantially and completely prevented. First, the seal structure 20 prevents the backflow. Since the seal structure 20 includes the seal 21 and the valve mechanism 25, the action of preventing the backflow is strong. Next, the dam flight 18 prevents the backflow. This is because the gap between the top portion of the dam flight 18 and the bore of the heating cylinder 2 is small, and thus this gap is filled with the molten resin to exert a high sealing action. The barrier flight 13 also prevents the backflow. Since the gap between the top portion of the sub-flight 15 and the bore of the heating cylinder 2 is small, a high sealing action is generated by the molten resin filled in this portion. That is, the inert gas or the resin does not flow back beyond the sub-flight 15. In the injection molding machine 1 according to the first embodiment of the present invention, since the barrier flight 13, the dam flight 18, and the seal structure 20 are provided in the first compression section 5, the inert gas or the resin can be substantially and completely prevented from flowing back.

Figure 2:
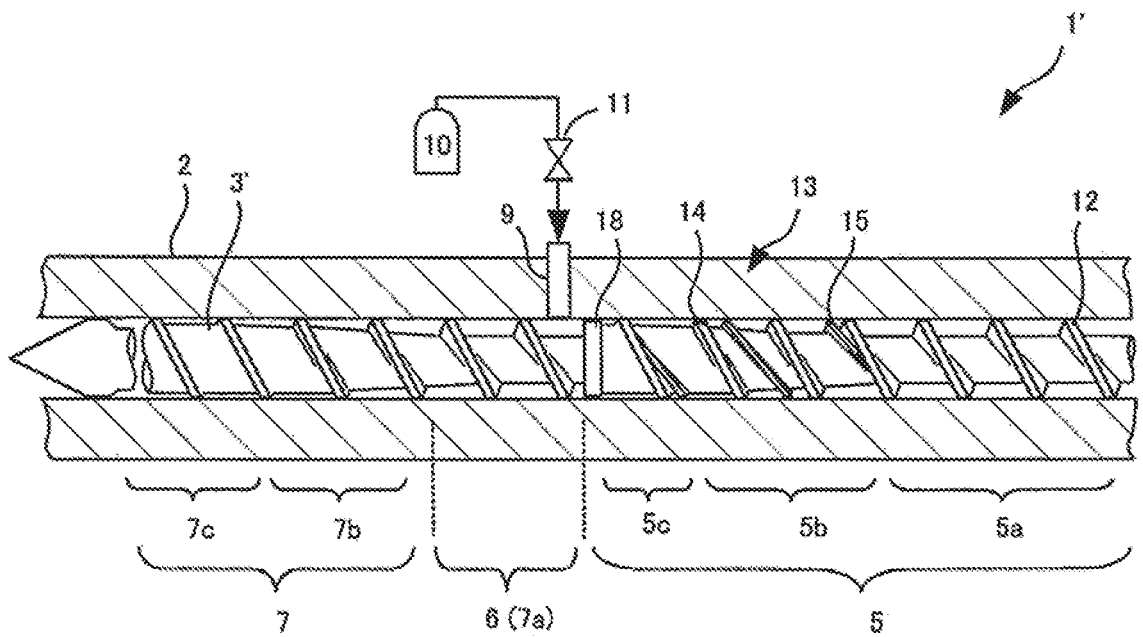
FIG. 2 is a side sectional view of an injection molding machine provided with a screw according to a second embodiment of the present invention.

The injection molding machine 1 according to the present embodiment can be modified in various ways. For example, in carrying out the present invention, the seal structure 20 is not always essential and can be omitted. FIG. 2 shows an injection molding machine 1' according to a second embodiment of the present invention in which the seal structure 20 is omitted. The same members as those of the injection molding machine 1 according to the first embodiment are designated by the same reference numerals, and the description thereof will be omitted. In the injection molding machine 1' according to this embodiment, only the barrier flight 13 and the dam flight 18 are provided as a structure for preventing backflow. Due to the sealing action of the molten resin filled in the narrow gap, the backflow of the inert gas or the resin can be prevented even when a screw 3' is stopped for about 10 minutes, for example. Since the seal structure 20 having a complicated structure can be omitted in the injection molding machine 1' according to the second embodiment, the injection molding machine 1' can be provided at a low cost.

Figure 4:
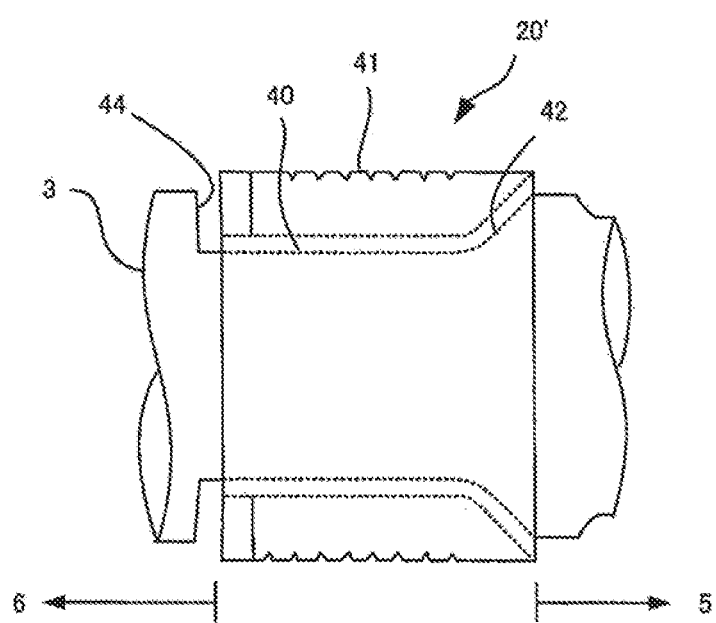
FIG. 4 is a diagram showing a seal structure provided on the screw according to the first embodiment of the present invention, which is a sectional view showing the seal structure cut parallel to the axis of the screw.

In the injection molding machine 1 according to the first embodiment, the seal structure 20 can be replaced with a seal structure 20' having a simple structure as shown in FIG. 4. The seal structure 20' includes a diameter-reduced portion 40 in which the diameter of the screw 3 is reduced, and a seal ring 41 which is provided in the diameter-reduced portion 40 with a predetermined gap therebetween. An outer peripheral surface of the seal ring 41 is smoothly in contact with the bore of the heating cylinder 2, and the molten resin does not flow from the outer peripheral surface. That is, the inside of the heating cylinder 2 is liquid-tightly separated by the seal ring 41 into the first compression section 5 on the upstream side and the starvation section 6 on the downstream side. The diameter-reduced portion 40 to which the seal ring 41 is fitted with a gap therebetween is expanded in diameter on the upstream side thereof to form a tapered surface 42, and an end portion of the seal ring 41 on the upstream side is also formed in a tapered shape. In the screw 3, an abutting portion 44 with which the seal ring 41 abuts is formed in the front of the diameter-reduced portion 40. When the screw 3 is rotated to send the molten resin forward, the pressure of the molten resin in the first compression section 5 is higher than the pressure of the molten resin in the starvation section 6, and the seal ring 41 moves forward with respect to the screw 3 and is pressed against the abutting portion 44. At this time, the tapered end portion of the seal ring 41 is separated from the tapered surface 42, and the first compression section 5 and the starvation section 6 communicate with each other through a gap between the diameter-reduced portion 40 and an inner peripheral surface of the seal ring 41, whereby the molten resin flows downstream. A predetermined notch is formed in an end surface of the seal ring 41, so that a flow path of the molten resin is ensured even when the seal ring 41 abuts against the abutting portion 44. On the other hand, during injection or the like, the seal ring 41 is seated on the tapered surface 42, the communication is cut off, and the flow of the molten resin is hindered. That is, the back flow is prevented.

In addition to this, the injection molding machines 1 and 1' according to the embodiments of the present invention can be modified in various ways. For example, in the first embodiment, the screw groove of the screw 3 is formed such that the first compression section 5 includes the supply portion 5a, the compression portion 5b, and the measurement portion 5c. Alternatively, the screw groove of the screw 3 may be formed such that, for example, the first compression section 5 includes the supply portion 5a and the compression portion 5b without the measurement portion 5c, or another configuration may be used. The resin is not limited as long as it is melted, compressed, kneaded, and sent forward. Similarly, the second compression section 7 has been described as including the compression portion 7b and the measurement portion 7c. Alternatively, it is not necessary to be limited to such a configuration as long as the molten resin and the inert gas are kneaded while being compressed and sent forward. The shape of the top portion of each of the single flight 12 and the barrier flight 13 formed on the screw 3 is not particularly described. The top portion may be formed in a flat shape such that a clearance with the bore of the heating cylinder 2 is constant, or may be formed in a stepped shape, that is, in a stepped shape such that the clearance changes. Although not described in detail, the second compression section 7 may include a single flight, a double flight, or a multi-row flight consisting of three or more flights. In the present embodiment, the inert gas has been described to be supplied into the heating cylinder 2 via the on-off valve 11. The on-off valve 11 may be opened and closed in synchronization with the molding cycle, or may be kept open at all times. It is also possible to configure the heating cylinder 2 such that the inert gas is always introduced into the heating cylinder 2 without providing the on-off valve 11. It is preferable that the pressure of the resin is lowered to a low pressure close to atmospheric pressure in the starvation section 6 in which the inert gas is introduced. However, it is not always necessary to do so, as long as the pressure of the resin is lower than that in the first compression section 5. If the inert gas is supplied at a gas pressure higher than this pressure, introduction is possible. The gas supplied to the heating cylinder 2 has been described as being an inert gas such as nitrogen and carbon dioxide, but the present invention is not limited to this. For example, hydrocarbons such as butane and gases such as chlorofluorocarbons and chlorofluorocarbons can also be used.

injection molding machine 1 including the barrier flight 13, the dam flight 18, and the seal structure 20.

Example 2: An injection molding machine 1' according to the second embodiment of the present invention. That is, the injection molding machine 1' including the barrier flight 13 and the dam flight 18.

Comparative Example 1: An injection molding machine including neither barrier flight 13 nor dam flight 18, having a seal structure having a structure same as the seal structure 20, and having a step-down relaxation section formed between the seal structure and the starvation section.

Comparative Example 2: An injection molding machine 1' according to the second embodiment of the present invention without the barrier flight 13. That is, an injection molding machine including only the dam flight 18.

Comparative Example 3: An injection molding machine 1' according to the second embodiment of the present invention without the dam flight 18. That is, an injection molding machine including only the barrier flight 13.

In these five injection molding machines, a test was conducted to see whether foam molding could be stably carried out, and a test was conducted to see whether the backflow was reliably prevented when stopping the rotation of the screw for 10 minutes while supplying the inert gas.

The resins used were a PP resin and a PA66 resin, and nitrogen gas was supplied as the inert gas. Nitrogen gas was supplied such that the pressure was 8 MPa for the PP resin, and such that the pressure was 6 MPa for the PA66 resin.

[Test Results]

The results of the experiment are shown in the following table.

TABLE 1

| | | | | PP resin; gas pressure 8 MPa | | PA66 resin; gas pressure 6 MPa | |
|---|---|---|---|---|---|---|---|
| | Seal structure | Dam flight | Barrier flight | Molding | Resistance within 10 minutes | Molding | Resistance within 10 minutes |
| Example 1 | ○ | ○ | ○ | ○ | ○ | ○ | ○ |
| Example 2 | — | ○ | ○ | ○ | ○ | ○ | ○ |
| Comparative Example 1 (*) | ○ | — | — | ○ | ○ | ○ | ○ |
| Comparative Example 2 | — | ○ | — | x | x | x | x |
| Comparative Example 3 | — | — | ○ | ○ | ○ | ○ | x |

(*) There is a step-down relaxation section

Although the present invention has been described above based on the embodiments, the technical scope of the present invention is not limited to the above-described embodiments, and various modifications can be made in carrying out the invention.

EXAMPLE 1

In order to confirm that foam molding can be stably carried out and that no backflow of the inert gas or the resin occurs when the rotation of screws 3 and 3' is stopped in the injection molding machines 1 and 1' according to the present embodiment, an experiment was conducted.

[Experimental Method]

The following five injection molding machines were prepared.

Example 1: An injection molding machine 1 according to the first embodiment of the present invention. That is, the In each of Examples 1 and 2 and Comparative Example 1, the foam molding is repeated and can be carried out stably, and even when the rotation of the screw is stopped for 10 minutes, the backflow of the inert gas and the resin does not occur. When the foam molding is restarted after 10 minutes, the foam molding can be restarted normally. In contrast, in Comparative Example 2, when the foam molding is repeated, the backflow of the inert gas and the resin occurs. The backflow of the inert gas is observed when the screw is stopped only for a few minutes. In Comparative Example 3, molding can be carried out stably when foam molding is repeated, but when a PA66 resin is used and the rotation of the screw is stopped for 10 minutes, the backflow of the inert gas occurs.

[Discussion]

It can be confirmed that when the injection molding machine 1 having a short machine length includes three sections consisting of the first compression section 5, the starvation section 6, and the second compression section 7 inside the heating cylinder 2, and the screw 3 is provided with the barrier flight 13 and the dam flight 18 at the portion corresponding to the first compression section 5, the foam molding can be carried out stably, and the back flow of the inert gas or the resin can be prevented even when the rotation of the screw 3 is stopped for 10 minutes, which is considered necessary for maintenance. It can be said that the combination of the barrier flight 13 and the dam flight 18 is effective in preventing the backflow of the inert gas. In the experiment, the injection molding machine of Comparative Example 2 could not stably carry out foam molding, but molding can be carried out if the pressure of the inert gas is made sufficiently smaller than the pressure in this experiment.

Here, the features of the embodiments of the screw of the injection molding machine for foam molding and the injection molding machine according to the present invention described above are briefly summarized in the following [1] to [5].

[1]
A screw (3) of an injection molding machine for foam molding in which a first compression section (5) in which a resin is to be compressed, a starvation section (6) in which a pressure of the resin is to be lowered, and a second compression section (7) in which the resin is to be compressed are provided in a heating cylinder (2) from a rear side to a front side thereof due to a shape of the screw (3), and in which a gas is to be introduced into the starvation section (6), the screw (3) including at a portion corresponding to the first compression section (5) of the screw (3): a barrier flight (13) including a combination of a main flight (14) and a sub-flight (15) having a lead angle larger than that of the main flight (14); and a dam flight (18) having a predetermined-width ring shape formed in front of the barrier flight (13).

[2]
In the screw (3) as described in [1], the screw (3) is provided with a predetermined seal structure (20) to prevent backflow of the resin between the dam flight (18) and the starvation section (6).

[3]
In the screw (3) as described in 121, the seal structure (20) includes: a seal (21) configured to liquid-tightly separate the first compression section (5) from the starvation section (6); a communication passage configured to communicate the first compression section (5) and the starvation section (6); and a valve mechanism configured to close the communication passage and cause a molten resin to flow into the starvation section (6) when the molten resin in the first compression section (5) exceeds a predetermined pressure.

[4]
In the screw (3) as described in [2], the seal structure (20) includes: a diameter-reduced portion (40) in which a diameter of the screw (3) is reduced; and a seal ring (41) which is fitted to the diameter-reduced portion (40) with a predetermined gap there between and which is liquid-tightly slid with respect to a bore of the heating cylinder (2), in which a tapered surface (42) is formed on the diameter-reduced portion (40) to block communication between the first compression section (5) and the starvation section (6) when the seal ring (41) is seated.

[5]
An injection molding machine (1) including the screw (3) according to any one of [1] to [4], in which the heating cylinder (2) is provided with an introduction port which introduces gas at a predetermined position corresponding to the starvation section (6).

Although the present invention has been described in detail with reference to specific embodiments, it will be apparent to those skilled in the art that various changes and modifications can be made without departing from the spirit and scope of the present invention.

This application is based on a Japanese Patent Application (Japanese Patent Application No. 2018-158759) filed on Aug. 27, 2018, the contents of which are incorporated herein by reference.

INDUSTRIAL APPLICABILITY

According to the present invention, it is possible to provide a screw of an injection molding machine with a sufficiently short machine length which has no concern about a phenomenon that a gas flows or leaks toward an upstream side of the screw in a heating cylinder during a molding cycle or when rotation of the screw is stopped due to maintenance or the like, that is, backflow in an injection molding machine for introducing a physical foaming agent containing a gas into a molten resin to mold a foam molded product, and which therefore can carry out molding stably and can be installed even in a limited installation area, and to provide an injection molding machine. Inventions exhibiting this effect are useful for a screw of an injection molding machine and an injection molding machine.

REFERENCE SIGNS LIST 1 injection molding machine
2 heating cylinder
3 screw
5 first compression section
6 starvation section
7 second compression section
9 inert gas introduction portion
12 single flight
13 barrier flight
14 main flight
15 sub-flight
18 dam flight
20 seal structure
21 seal
23 flow control mechanism
24 communication passage
25 valve mechanism
27 seating surface
28 poppet valve
33 disc spring
40 diameter-reduced portion
41 seal ring
42 tapered surface
44 abutting portion

The invention claimed is:
1. A screw of an injection molding machine for foam molding comprising:
   a main flight;
   a sub-flight having a lead angle larger than that of the main flight;
   a barrier flight comprising the main flight and the sub-flight;
   a dam flight having a ring shape formed in front of the barrier flight;

a first compression section in which a resin is to be compressed;

a starvation section in which a pressure of the resin is to be lowered;

and a second compression section in which the resin is to be compressed, wherein the first compression section, the starvation section and the second compression section are provided from a rear side to a front side of the screw in a heating cylinder, wherein the starvation section is configured to have a gas introduced therein, and wherein the barrier flight and the dam flight are provided at a portion corresponding to the first compression section of the screw.

2. The screw according to claim 1, wherein the screw is provided with a predetermined seal structure to prevent backflow of the resin between the dam flight and the starvation section.

3. The screw according to claim 2, wherein the seal structure comprises:
 a seal configured to liquid-tightly separate the first compression section from the starvation section;
 a communication passage configured to communicate the first compression section and the starvation section; and
 a valve mechanism configured to close the communication passage and cause a molten resin to flow into the starvation section when the molten resin in the first compression section exceeds a predetermined pressure.

4. The screw according to claim 2, wherein the seal structure comprises:
 a diameter-reduced portion in which a diameter of the screw is reduced; and
 a seal ring which is fitted to the diameter-reduced portion with a predetermined gap therebetween and which is liquid-tightly slid with respect to a bore of the heating cylinder, wherein a tapered surface is formed on the diameter-reduced portion to block communication between the first compression section and the starvation section when the seal ring is seated.

5. An injection molding machine comprising the screw according to claim 1, wherein the heating cylinder is provided with an introduction port which introduces gas at a predetermined position corresponding to the starvation section.

6. The screw according to claim 1, wherein the dam flight is formed in front of the barrier flight continuous with the barrier flight or at a predetermined interval with respect to the barrier flight.

* * * * *